US008850556B2

(12) United States Patent
Freund et al.

(10) Patent No.: US 8,850,556 B2
(45) Date of Patent: Sep. 30, 2014

(54) INTERACTIVE VIDEO CAPTCHA (75) Inventors: Thomas J. Freund, Austin, TX (US);
Travis M. Grisby, Austin, TX (US);
Albert A. Lamb, Somerville, MA (US);
Lee M. Surprenant, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 12/506,281

(22) Filed: Jul. 21, 2009

(65) Prior Publication Data
US 2011/0023110 A1    Jan. 27, 2011

(51) Int. Cl.
| | | |
|---|---|---|
| G06F 21/00 | (2013.01) | |
| G06F 3/048 | (2013.01) | |
| H04L 29/06 | (2006.01) | |
| G06F 21/36 | (2013.01) | |
| H04L 9/32 | (2006.01) | |
| G06F 21/46 | (2013.01) | |

(52) U.S. Cl.
CPC .............. G06F 21/46 (2013.01); G06F 3/048 (2013.01); H04L 63/105 (2013.01); G06F 21/36 (2013.01); H04L 9/32 (2013.01); H04L 63/083 (2013.01)
USPC ............ 726/16; 726/3; 726/5; 726/7; 726/19; 726/28; 726/29; 713/168; 713/176; 382/103

(58) Field of Classification Search
CPC ......... G06F 21/36; G06F 21/46; G06F 3/048; H04L 63/105; H04L 63/083; H04L 9/32
USPC ........... 726/2, 5, 16, 7, 19, 28, 29; 705/14.54, 705/14.41, 10, 14; 713/168, 176; 382/103
See application file for complete search history.

(56) References Cited

U.S. PATENT DOCUMENTS

| 7,062,073 B1 | 6/2006 | Tumey et al. | |
|---|---|---|---|
| 7,383,572 B2 * | 6/2008 | Rolfe | 726/5 |

(Continued)

FOREIGN PATENT DOCUMENTS

| AU | 2005100275 | * | 6/2005 | .............. G06F 12/14 |
|---|---|---|---|---|

OTHER PUBLICATIONS

Iglesias et al., "Haptics for Recognizing and Quantifying Hand Movement Patterns for Authentication", Oct. 3-5, 2007, IEEE International Sympossium on Intelligent Signal Processing, pp. 1-6.*

(Continued)

*Primary Examiner* — Kambiz Zand
*Assistant Examiner* — Tongoc Tran
(74) *Attorney, Agent, or Firm* — John D. Flynn; Gregory K. Goshorn; Greg Goshorn, P.C.

(57) ABSTRACT

Provided is a Captcha Access Control System (CACS) for generating an improved captcha that are based, in one described embodiment, upon a command in one format and a response in a different format, one or both of which are rendered in a format that is difficult for an automated system to interpret. A computer system or program to which a user is requesting access generates a textual or audible command. A video device captures the user's response and transmits the response to a response evaluation device. Based upon an analysis of the transmitted video and a comparison between the analyzed video and the command, the computer or program either enables access or denies access.

12 Claims, 5 Drawing Sheets

(56) References Cited

U.S. PATENT DOCUMENTS

| | | | |
|---|---|---|---|
| 7,552,467 B2* | 6/2009 | Lindsay | 726/5 |
| 8,019,127 B2* | 9/2011 | Misra | 382/115 |
| 2005/0114705 A1 | 5/2005 | Reshef et al. | |
| 2006/0224761 A1 | 10/2006 | Howarth et al. | |
| 2007/0005500 A1 | 1/2007 | Steeves et al. | |
| 2007/0026372 A1 | 2/2007 | Huelsbergen | |
| 2007/0050627 A1 | 3/2007 | Chiku | |
| 2007/0143624 A1 | 6/2007 | Steeves | |
| 2008/0009345 A1 | 1/2008 | Bailey et al. | |
| 2008/0037875 A1* | 2/2008 | Kim et al. | 382/199 |
| 2008/0066014 A1 | 3/2008 | Misra | |
| 2008/0072293 A1 | 3/2008 | D'Urso | |
| 2008/0080743 A1 | 4/2008 | Schneiderman et al. | |
| 2008/0127302 A1* | 5/2008 | Qvarfordt et al. | 726/2 |
| 2008/0133347 A1* | 6/2008 | Josifovski et al. | 705/14 |
| 2008/0133348 A1* | 6/2008 | Reed et al. | 705/14 |
| 2009/0012855 A1* | 1/2009 | Jamal et al. | 705/14 |
| 2009/0055193 A1* | 2/2009 | Maislos et al. | 704/273 |
| 2009/0150983 A1* | 6/2009 | Saxena et al. | 726/7 |
| 2009/0210937 A1* | 8/2009 | Kraft et al. | 726/17 |
| 2009/0259588 A1* | 10/2009 | Lindsay | 705/40 |
| 2009/0328163 A1* | 12/2009 | Preece | 726/5 |
| 2010/0306055 A1* | 12/2010 | Kolb | 705/14.55 |

OTHER PUBLICATIONS

Gkalelis et al., "View Indepedent human movement recognition from multi-view video exploiting a circular invariant posture representation", ICME 2009, pp. 394-397.*

Saloman et al., "Evolutionary Tuning of Neural Neetworks for Gesture Recognition", 2000, IEEE pp. 1528-1534.*

Fischer et al.; "Visual CAPTCHAs for Document Authentication;" Telecommunications Lab, Saarland University; Saarbrucken, Germany, 2006.

* cited by examiner

INTERACTIVE VIDEO CAPTCHA

FIELD OF THE DISCLOSURE

The claimed subject matter relates generally to computer security and, more specifically, to a technique for preventing automated usage of computing resources.

SUMMARY

Provided are techniques for the improvement of computer security and quality of service. A Completely Automated Public Turing Test to Tell Computers and Humans Apart, or "captcha," is a challenge-response test used in computing to determine whether a potential user of computing resources is a human or the result of automated software, or a "bot." One simple example of a captcha is a box displayed on a computer screen that contains a number of characters that may be different sizes, different fonts, overlapping, partially obscured and/or set against a visually complicated background. The value of such a captcha is that current computer character recognition programs are unable to distinguish the individual characters and provide a correct response. On the other hand, the captcha is intended to be easily solved by a human user.

As the Inventors herein have recognized, captchas suffer from a number of accessibility issues as well as circumventions associated with artificially intelligent character recognition programs. For example, a user who is blind typically may rely upon a program that reads alternative text, or a caption, transmitted in conjunction with an image to which the blind user can listen. Obviously, such a program would defeat the purpose of a captcha, although often a captcha will provide the option of delivering an audio sample. Further, a captcha that is simple enough for a character recognition program would be simple enough for most automated systems to understand. A user who is deaf would also experience similar problems with captcha that are primarily audible in nature. In addition, as computers and computer recognition programs have become more sophisticated and powerful, captchas must also become more difficult for a human to read or hear.

Provided is a Captcha Access Control System (CACS) for generating improved captcha that are based, in one described embodiment, upon a command and a response in a rich media format that is difficult for an automated system to simulate. Examples of rich media are digitally encoded audio or video information or the combination of these media with each other and/or with simple textual information. In other words, the term "rich media" includes, but is not limited to video, audio or other type of media difficult for a computer to generate, possibly combined with other types of media such as text. The term "difficult for a computer to generate" implies the use of some "real world" sensory information (taste, touch, see, smell, hear) digitally encoded in a response.

In the following examples, a computer system or program to which a user is requesting access generates a textual or audible command, e.g. "raise your right hand." A video device captures the user's response and transmits the response to a response evaluation device. Based upon an analysis of the transmitted video and a comparison between the analyzed video and the command, the computer or program either enables access, i.e. to a human user, or denies access, i.e. to an automated program, or bot. It should be noted that the disclosed technology is not limited to textual commands and video responses but, as those with skill in the computing arts should appreciate, there are many possible forms that the initial command and responding action could take other than text and video. For example, the command could be graphical and the response could be audible.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One embodiment, in accordance with the claimed subject, is directed to a programmed method for preventing unauthorized access to a computing resource. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
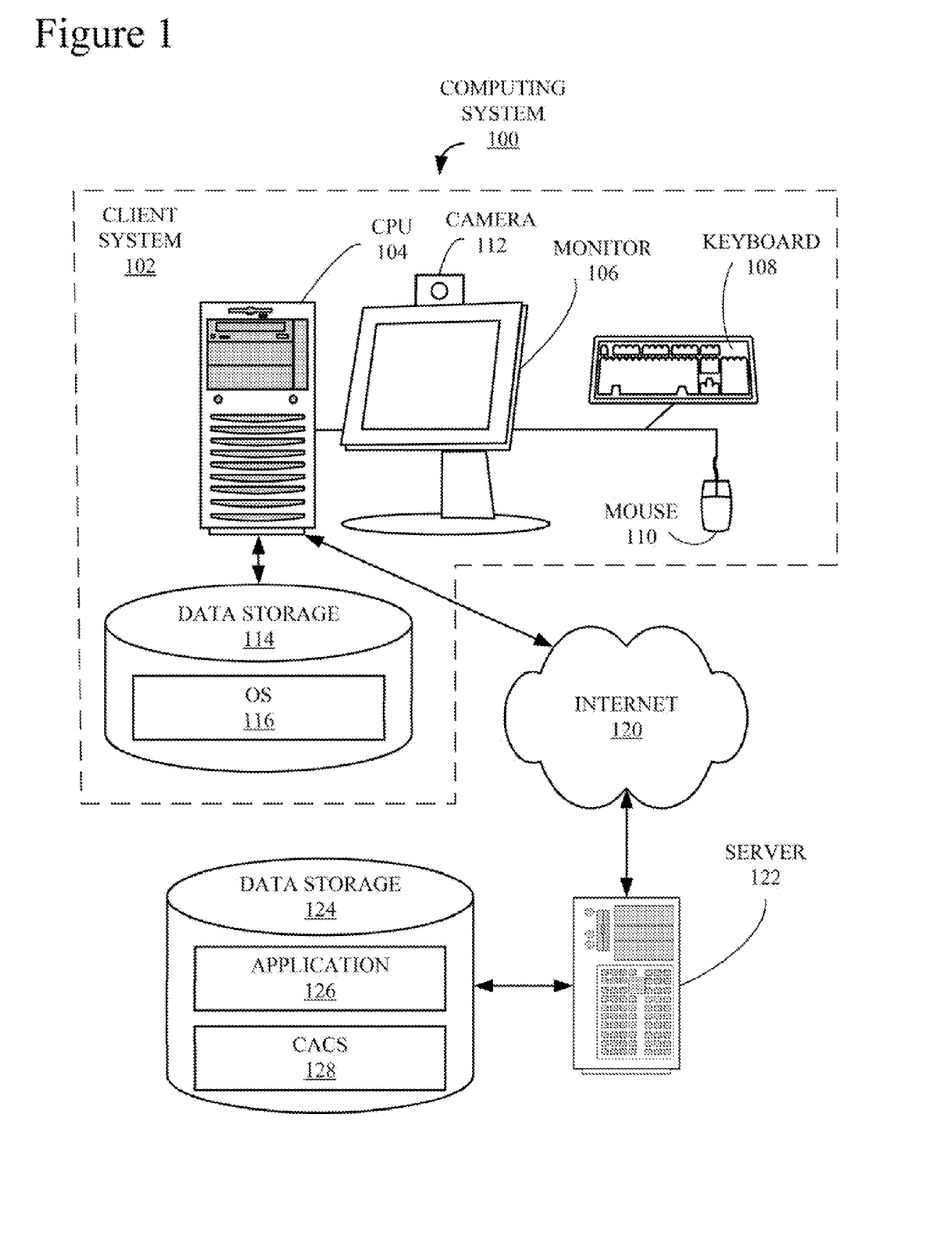
FIG. 1 is a block diagram of an example of a computing system architecture that may implement the claimed subject matter.

Turning now to the figures, FIG. 1 is a block diagram of a computing system architecture 100 that may implement the claimed subject matter. A client system 102 includes a central processing unit (CPU) 104, or "processor," coupled to a monitor 106, a keyboard 108, a mouse 110 and a camera 112, which together facilitate human interaction with computing system 100 and client system 102. Also included in client system 102 and attached to CPU 104 is a data storage component 114, which may either be incorporated into CPU 104 i.e. an internal device, or attached externally to CPU 104 by means of various, commonly available connection devices such as but not limited to, a universal serial bus (USB) port (not shown). In this example, data storage 114 is illustrated storing an operating system (OS) 116, which controls the operation of CPU 104 and the remainder of client system 102.

Client system 102 and CPU 104 are connected to the Internet 120, which is also connected to server computer 122. Although in this example, client system 102 and server 122 are communicatively coupled via the Internet 120, they could also be coupled through any number of communication mediums such as, but not limited to, a local area network (LAN) (not shown). Further, it should be noted there are many possible computing system configurations, of which computing system 100 is only one simple example. Although not shown, like client system 102, server 122 also includes a CPU, a monitor, a keyboard, a mouse and an OS.

Server 122 is coupled to a data storage 124, which like data storage 114, may either be incorporated into server 122 i.e. an internal device, or attached externally to server 122 by means of various, commonly available connection devices such as but not limited to, a universal serial bus (USB) port (not shown). Stored on data storage is an application 126 and a Captcha Access Control System 128. Application 126 is employed through the Specification as an example of an application to which a user may request access via server 122, to which access is controlled by CACS 128. It should be noted that a typical computing system would include more than one application, but for the sake of simplicity only one is shown. In addition, computing entities other than applications may employ the disclosed techniques to control access. For example, CACS 128 may be employed by a server 124 to control access to a website (not shown). CACS 128 is described in more detail below in conjunction with FIGS. 2-5.

Figure 2:
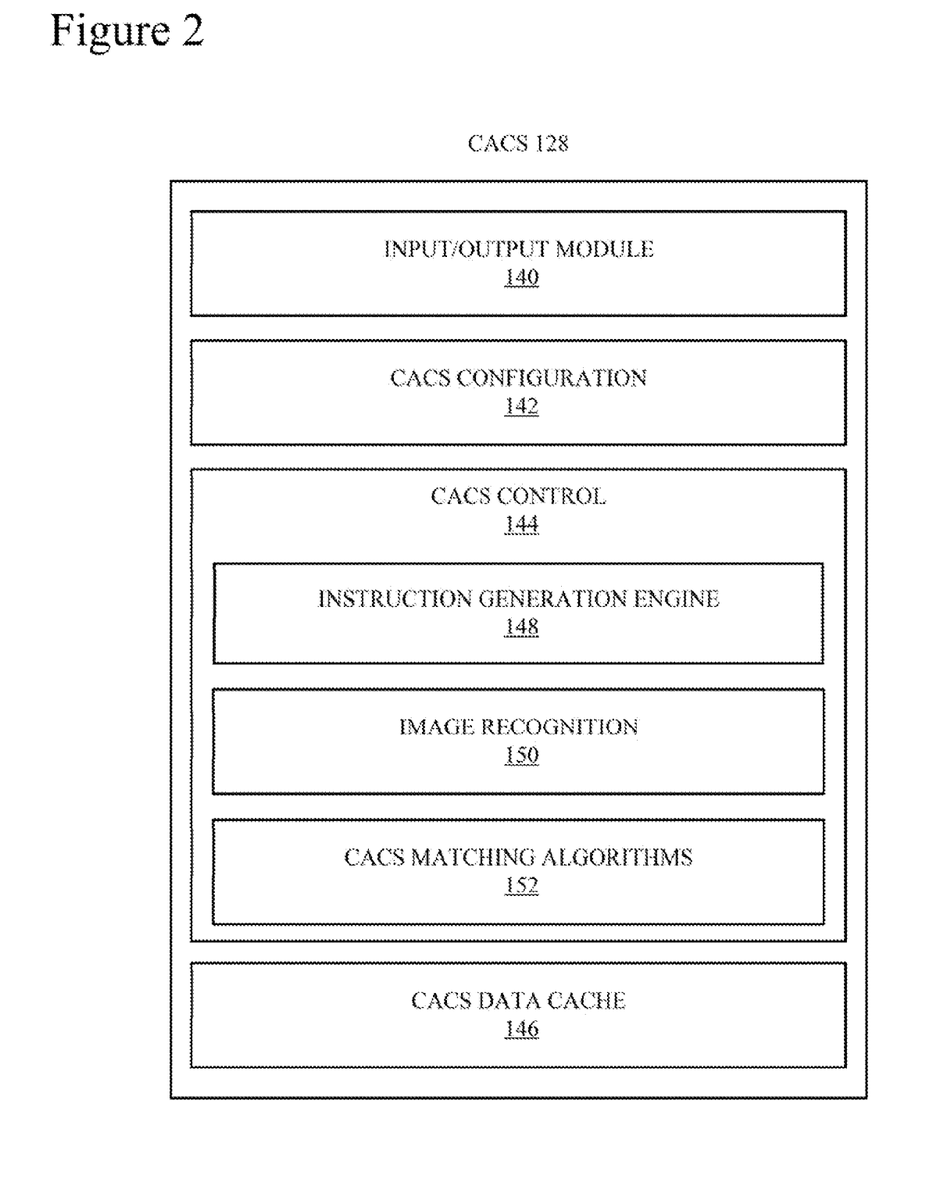
FIG. 2 is a block diagram of a Captcha Access Control System (CACS), first introduced in FIG. 1, in more detail.

FIG. 2 is a block diagram of CACS 128, first introduced in FIG. 1, in more detail. In this example, CACS 128 is stored on data storage 124 (FIG. 1) and executed on server 122 (FIG. 1). Of course, CACS 128 could also be stored and executed on another remote computing system (not shown) to control access to resources of server 122 by users such as client system 102. CACS 128 includes an input/output (I/O) module 140, a CACS Configuration module 142, a CACS Control module 144 and a CACS data cache component 146. It should be understood that the representation of CACS 128 in FIG. 2 is a logical model. In other words, components 140, 142, 144, 146 and other components described below may be stored in the same or separate files and loaded and/or executed within system 100 either as a single system or as separate processes interacting via any available inter process communication (IPC) techniques.

I/O module 140 handles communication CACS 128 has with other components of computing system 102 and system 100. CACS configuration module 142 stores parameters defined by an administrator to control the setup and operation of CACS 128. Examples of such configuration parameters include, but are not limited to, security settings, display options and so on. In addition, parameters may be defined that list potential users, applications and computing hosts and corresponding levels of security and specific implementations of the claimed technology.

CACS Control module 144 stored the logic that controls the operation of CACS 128. Examples of logic modules that may be included in module 144 include an Instruction Generation Engine (IGE) 148, an Image Recognition module 150 and CACS Matching Algorithms 152. Although these particular examples are related to the generation of textual commands and video actions, those with skill in the art should appreciate that similar modules could be deployed with respect to other types of commands and actions.

IGE 148 generates commands that are transmitted to a user that has requested access to a CACS 128 controlled resource. Image recognition module 150 analyzes an action that CACS 128 has received in response to a command generated by IGE 148. CACS MA module 152 determines whether or not the action analyzed by module 150 correlates to the command generated by IGE 148. The operations of modules 144, 148, 150 and 152 are described in more detail below in conjunction with FIGS. 3-5.

CACS Data Cache 146 is a data repository for information, including settings and lists that CACS 128 requires during operation. Examples of the types of information stored in cache 146 include, but are not limited to, specific commands employed in conjunction with IGE 148, corresponding patterns associated with the processing of modules 150 and 152, with each action correlated with a particular acceptable action based upon the patterns, and a list of computing systems of resources that are configured to employ CACS 128 to control access. In addition, cache 146 may store intermediate results associated with the processing of CACS 128.

Figure 3:
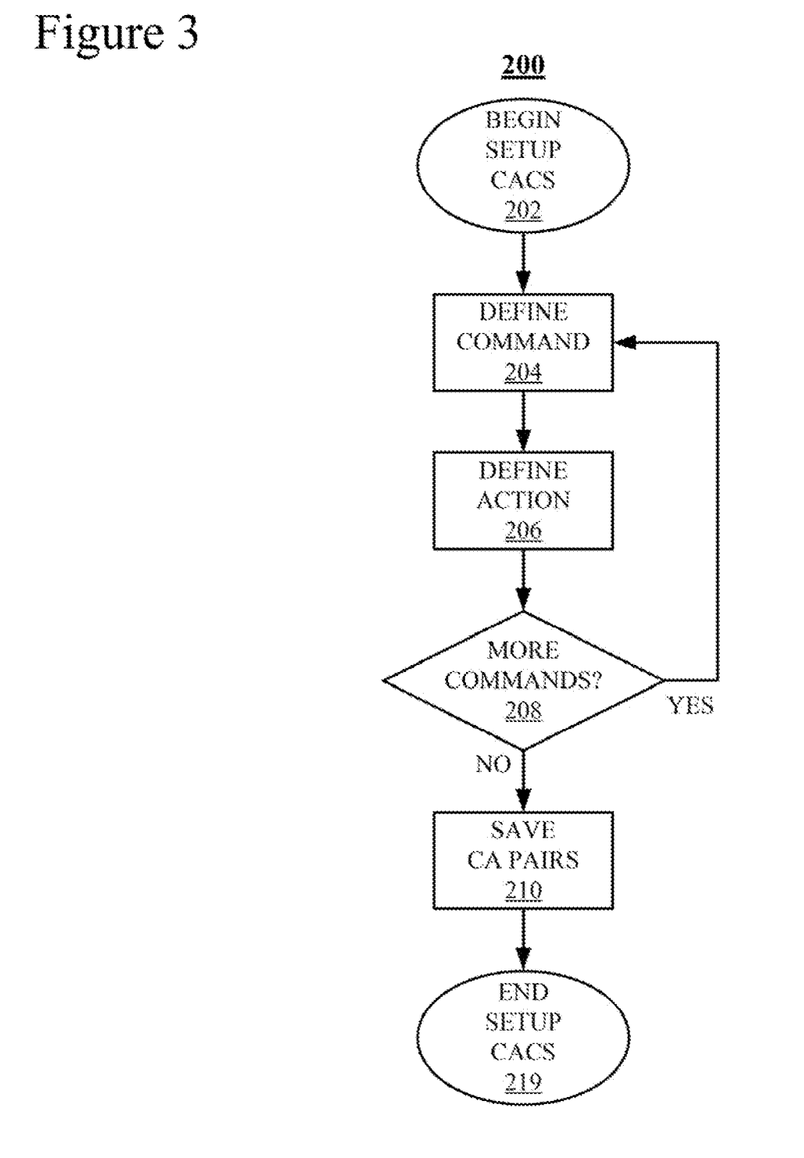
FIG. 3 is a flowchart of a Setup CACS process that may implement one aspect of the claimed subject matter.

FIG. 3 is a flowchart of a Setup CACS process 200 that may implement one aspect of the claimed subject matter. In this example, logic associated with process 200 is stored on data storage 124 (FIG. 1) as part of CACS 128 (FIGS. 1 and 2) and executed on the processor associated with server 122. In the alternative, process 200, as well as CACS 128 may be incorporated into application 126 (FIG. 1) or the OS of server 122.

Process 200 starts in a "Begin Setup CACS" block 202 and proceeds immediately to a "Define Command" block 204. During block 204, an administrator of CACS 128 defines a command that a user requesting access to, in this example, application 118 (FIG. 1). Examples of commands, each of which may ultimately be delivered via text, audio or video, include, but are not limited to, "raise you left hand," "wave your hand over your head" or "stand up and dance." During a "Define Action" block 206, the administrator programmatically defines an action that corresponds to the command defined during block 204. For example, for the command "raise your left hand," the defined action may be an indication of an upward movement along the right side of a series of video frames; for "wave you hand over your head," the defined action may be an indication of movement back and forth across the top of a series of video frames. In addition to video type responses to actions, other rich media responses are contemplated. Those with skill in the programming arts should understand the image and other rich media recognition algorithms necessary to define such actions. It is also contemplated that a graphical user interface (GUI) be provided to facilitate the definition of such actions.

It should also be understood that neither commands nor actions are limited to text and video. For example a command may be an audible cue, such as "Say Hey!" and the corresponding action may be defined with respect to voice recognition logic to detect an appropriate audible response. In other words, both the command and the expected action may be encoded in rich media formats.

During a "More Commands?" block 208, process 200 determines whether or not the user has indicated that more command/action pairs are to be defined. If so, control returns to block 204 and processing continues as described above. If not, process 200 proceeds to a "Save CA Pairs" block 210 during which the command/action pairs defined during iterations through blocks 204 and 206 are saved to memory associated with CACS 128 (see element 142, FIG. 2). Finally, control proceeds to an "End Setup CACS" block 219 in which process 200 is complete.

Figure 4:
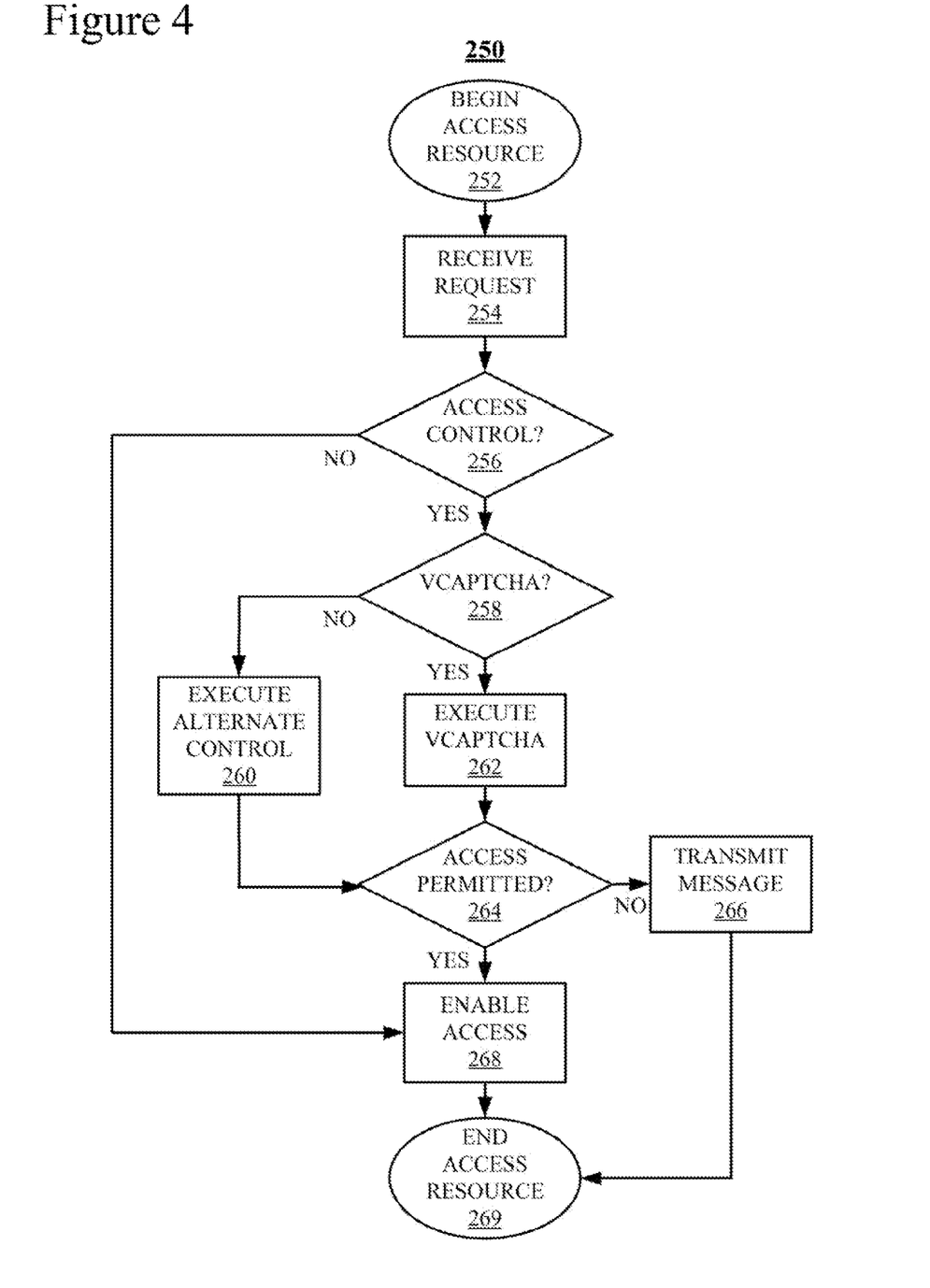
FIG. 4 is a flowchart of an Access Resource process that may implement a second aspect of the claimed subject matter.

FIG. 4 is a flowchart of an Access Resource process 250 that may implement a second aspect of the claimed subject matter. Like process 200 (FIG. 3), logic associated with process 250 is stored on data storage 124 (FIG. 1) as part of CACS 128 (FIGS. 1 and 2) and executed on server 122. In the alternative, process 250, as well as CACS 128 may be incorporated into application 126 (FIG. 1). In this example, either a user or an automated program (not shown) is accessing application 128, which utilizes the protection from unauthorized access provided by the claimed subject matter.

Process 250 starts in a "Begin Access Resource" block 252 and proceeds immediately to a "Receive Request" block 244. During block 204, application 126 has received a request for access. During an "Access Control?" block 256, process 250 determines whether or not application 126 is configured for access control. If so, process 250 proceeds to a "V_Captcha" block 258 during which process 250 determines whether or not application 126 is configured to implement the disclosed techniques, which in this example is a video-based captcha, or "V_captcha." If not, process 250 proceeds to an "Execute Alterative Control" block 260 during which a standard captcha or other access control technique is executed. If during block 258, process 250 determines that $V_{13}$ captcha techniques are implemented, control proceeds to an "Execute V_Captcha" block 262. During block 262, the claimed subject matter is executed to determine a status, either "Access Success" or "Access Fail" (see process 300, FIG. 5).

Once execution of block 260 or block 262 has completed, control proceeds to an "Access Permitted?" block 264 during which process 250 determines if an Access Success code has been received. If not process 250 proceeds to a "Transmit Message" block 266 during which a message indicating that access has been denied is transmitted to the entity that sent the request received during block 254. If during block 264, process 250 determines that the access status is Access Success or, during block 256, process 250 has determined that no access controls have been implemented, control proceeds to an "Enable Access" block 268 during which the user who transmitted the request received during block 254 is permitted access to, in this example, application 126. Finally, once processing has completed with respect to blocks 266 or 268, control proceeds to an "End Access Resource" block 269 in which process 250 is complete.

Figure 5:
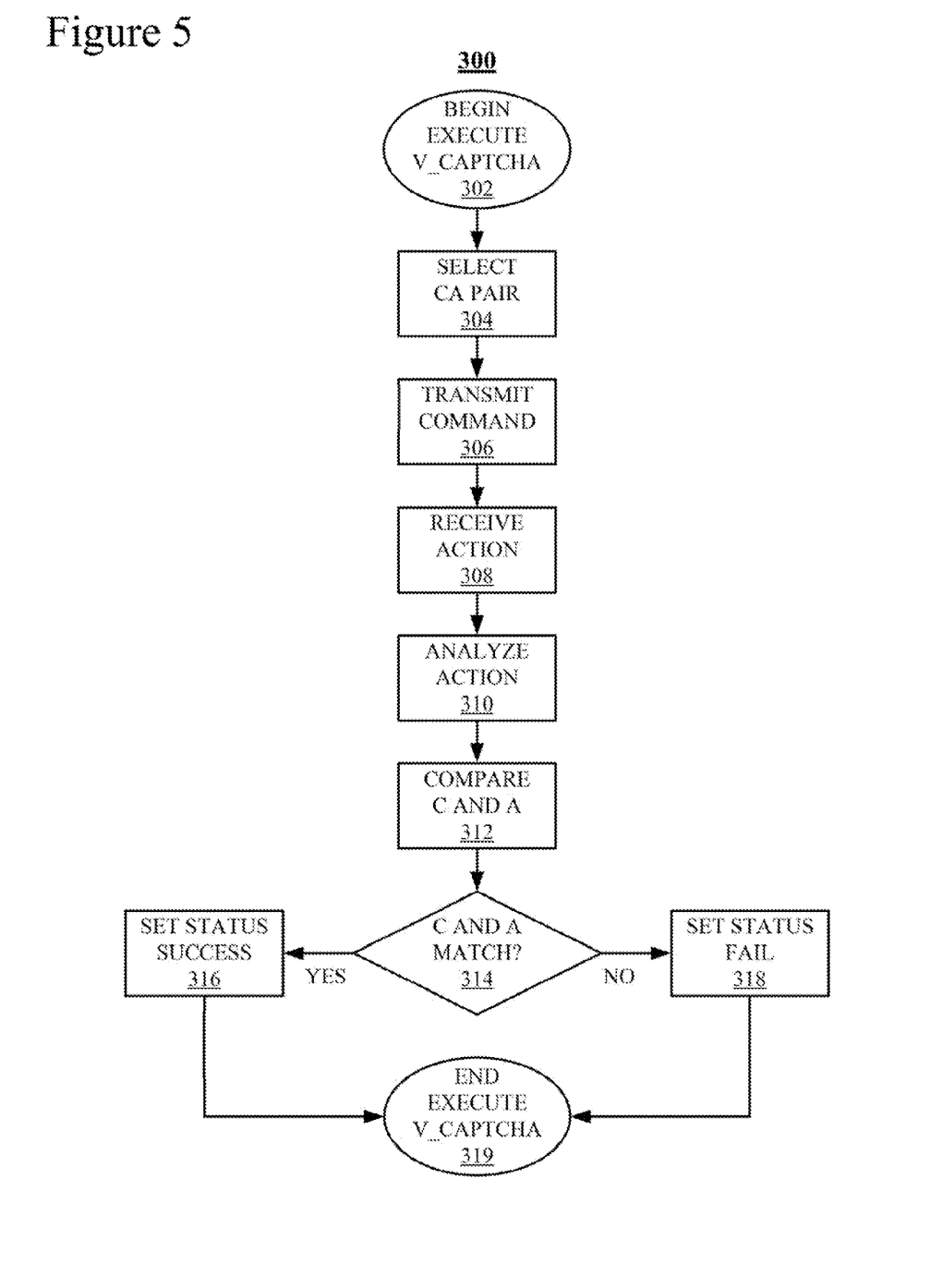
FIG. 5 is a flowchart of an Execute Captcha process that may implement a third aspect of the claimed subject matter.

FIG. 5 is a flowchart of an Execute V_Captcha process 300 that may implement a third aspect of the claimed subject matter. Like process 200 (FIG. 3) and process 250 (FIG. 4), logic associated with process 300 is stored on data storage 124 (FIG. 1) as part of CACS 128 (FIGS. 1 and 2) and executed on server 122. In the alternative, process 200, as well as CACS 128 may be incorporated into application 126 (FIG. 1).

Process 300 starts in a "Begin Execute V_Captcha" block 302 and proceeds immediately to a "Select CA Pair" block 304. During block 304, process 300 selects a command/action (C/A) pair (see 204 and 206, FIG. 3) to present in response to an access request (see 254, FIG. 4). During a "Transmit Command" block 306, the command portion of the CA pair selected during block 304 is transmitted to the entity that initiated the request. As mentioned above, there are several formats that the transmitted command can take such as, but not limited, text-based instructions displayed on the, in this example, monitor 106 (FIG. 1) of client system 102 (FIG. 1), audible instructions played on audible instructions played on speakers (not shown) of client system 102, video instructions displayed on monitor 104 or combinations of different media types. As mentioned above, the selection of a particular command/action pair may be defined by the configuration of CACS 128 (see element 142, FIG. 2).

Once a command has been transmitted, the entity that has requested access has a period of time to respond with a reply. In this example, the reply would be a physical action, such as the waving of a hand, captured in a video format by camera 112 (FIG. 1) of client system 102. In the alternative, the response could be a spoken word or phrase captured by a microphone (not shown) or any other rich media response that would be difficult for an automated process to generate based upon the given command. Of course, the command may also be rendered in a rich media format that would make it difficult for an automated program to analyze the exact nature of the request.

Once the response action has been transmitted, control of process 300 proceeds to a "Receive Action" block 308 during which the response is received by server 122. During an "Analyze Action" block 310, process 300 parses the action by applying an appropriate technology to determine the nature of the response (see). For example, with respect to a video response, image processing logic may be applied (see element 150, FIG. 2). During a "Compare C and A" block 312, the command transmitted during block 306 is compared with the corresponding action of the CA pair selected during block 304 in light of the analysis executed during block 310.

During a "C and A Match?" block 314, process 300 determines whether or not the received action meets the minimum requirement of a "correct answer" (see 204 and 206, FIG. 3). If so, during a "Set Status Success" block 316 a status parameter is set to a value of "Success." If not, during a "Set Status Fail" block 318, the status is set to a value of "Fail." Finally, control proceeds to an "End Execute V_Captcha" block 319 in which process 300 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for providing access control for a computing resource, comprising:
   defining a command and an action corresponding to the command, wherein the action is a physical movement of a user;
   defining a minimum requirement of correspondence between the action and a response to the command, wherein the response is in a video format and the correspondence is not based upon a previous pre-recorded response by the user;
   receiving a request to access a computing system;
   transmitting the command to a computing system from which the request originated;
   receiving the response to the command;
   comparing the response and the action to determine whether or not the response meets the minimum requirement; and
   enabling access to the computing resource if the response meets the minimum requirement.

2. The method of claim 1, further comprising denying access to the computing resource if the response fails to meet the minimum requirement.

3. The method of claim 1, wherein the command is defined in a rich media format.

4. The method of claim 1, wherein the command and the response are in different media formats.

5. The method of claim 1, further comprising:
   capturing the response with a video device; and
   converting the response into a digitally encoded video format.

6. A system for providing access control for a computing resource, comprising:

a processor;

a computer readable storage medium coupled to the processor; and logic, stored on the computer readable storage medium and executed on the processor, for:

defining a command and an action corresponding to the command, wherein the action is a physical movement of a user;

defining a minimum requirement of correspondence between the action and a response to the command, wherein the response is in a video format and the correspondence is not based upon a previous pre-recorded response by the user;

receiving a request to access a computing system;

transmitting the command to a computing system from which the request originated;

receiving the response to the command;

comparing the response and the action to determine whether or not the response meets the minimum requirement; and     enabling access to the computing resource if the response meets the minimum requirement.

7. The system of claim 6, the logic further comprising logic for denying access to the computing resource if the response fails to meet the minimum requirement.

8. The system of claim 6, wherein the command is defined in a rich media format.

9. The system of claim 6, the logic further comprising logic for:

capturing the response with a video device; and converting the response into a digitally encoded video format.

10. A computer programming product for providing access control to a computing resource, comprising;

a computer readable storage medium; and logic, stored on the computer readable storage medium for execution on a processor, for:

defining a command and an action corresponding to the command, wherein the action is a physical movement of a user;

defining a minimum requirement of correspondence between the action and a response to the command, wherein:

the response is in a video format; and             the correspondence is not based upon a previous pre-recorded response by the user;

receiving a request to access a computing system;

transmitting the command to a computing system from which the request originated;

receiving the response to the command;

comparing the response and the action to determine whether or not the response meets the minimum requirement; and         enabling access to the computing resource if the response meets the minimum requirement.

11. The computer programming product of claim 10, the logic further comprising logic for denying access to the computing resource if the response fails to meet the minimum requirement.

12. The computer programming product of claim 10, the logic further comprising logic for:

capturing the response with a video device; and converting the response into a digitally encoded video format.

\* \* \* \* \*